United States Patent [19]

Mouri et al.

[11] Patent Number: 4,818,078

[45] Date of Patent: Apr. 4, 1989

[54] FERROELECTRIC LIQUID CRYSTAL OPTICAL MODULATION DEVICE AND DRIVING METHOD THEREFOR FOR GRAY SCALE DISPLAY

[75] Inventors: Akihiro Mouri, Kokubunji; Hiroyuki Kitayama, Sagamihara; Shuzo Kaneko; Tohru Takahashi, both of Tokyo; Masahiko Enari, Yokohama; Mitsutoshi Kuno, Tokyo; Tsutomu Toyono, Yokohama, all of Japan

[73] Assignee: Canon Kabushiki Kaisha, Tokyo, Japan

[21] Appl. No.: 934,920

[22] Filed: Nov. 25, 1986

[30] Foreign Application Priority Data

Nov. 26, 1985 [JP] Japan ................................ 60-266980
Mar. 20, 1986 [JP] Japan ................................ 61-063456
Mar. 20, 1986 [JP] Japan ................................ 61-063458

[51] Int. Cl.⁴ .............................................. G02F 1/13
[52] U.S. Cl. .............................. 350/350 S; 350/333; 350/336
[58] Field of Search ................. 350/333, 336, 350 S

[56] References Cited

U.S. PATENT DOCUMENTS

| | | | |
|---|---|---|---|
| 4,326,776 | 4/1982 | Banda | 350/336 |
| 4,335,937 | 6/1982 | Takamatsu et al. | 350/336 |
| 4,367,924 | 1/1983 | Clark | 350/334 |
| 4,384,763 | 5/1983 | Russo | 350/336 X |
| 4,390,244 | 6/1983 | Hareng et al. | 350/336 X |
| 4,508,429 | 4/1985 | Nagae et al. | 350/350 S |
| 4,591,886 | 5/1986 | Umeda et al. | 350/350 S X |

FOREIGN PATENT DOCUMENTS 0106386  4/1984  European Pat. Off. .

OTHER PUBLICATIONS

Applied Physics Letters, vol. 36, No. 11, pp. 899–901, "Submicrosecond Bistable Electro-Optic Switching in Liquid Crystals", Clark, Lagerwall, 6/11/80.

Primary Examiner—Stanley D. Miller
Assistant Examiner—Richard Gallivan
Attorney, Agent, or Firm—Fitzpatrick, Cella, Harper & Scinto

[57] ABSTRACT

An optical modulation device comprises a first substrate having thereon a first conductor film, a second substrate having thereon a second conductor film disposed opposite to the first conductor film, and an optical modulation material disposed between the first and second substrates. The optical modulation device is driven by forming a potential gradient along the extension of the first conductor film or both the first and second conductor films, and applying an information signal to the first or second conductor film.

58 Claims, 9 Drawing Sheets

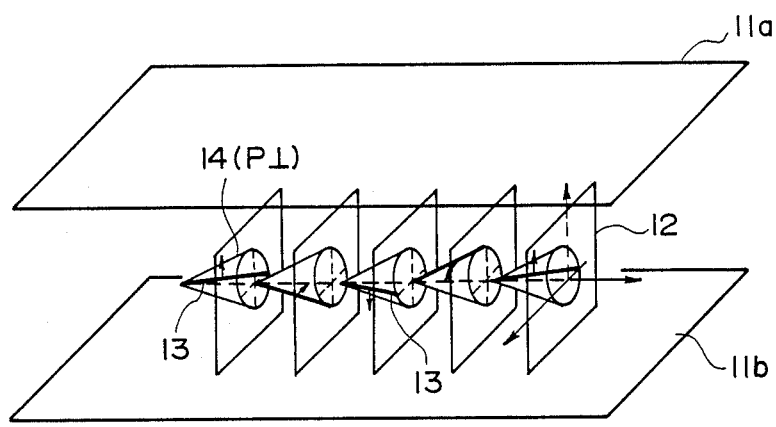
F I G. 1
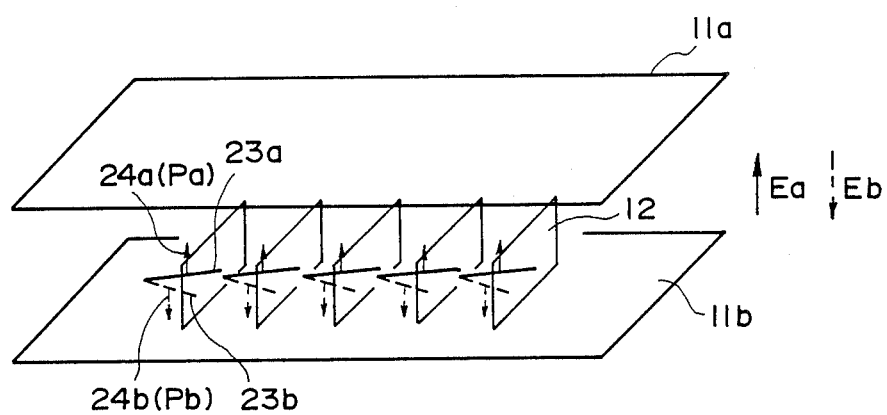
F I G. 2

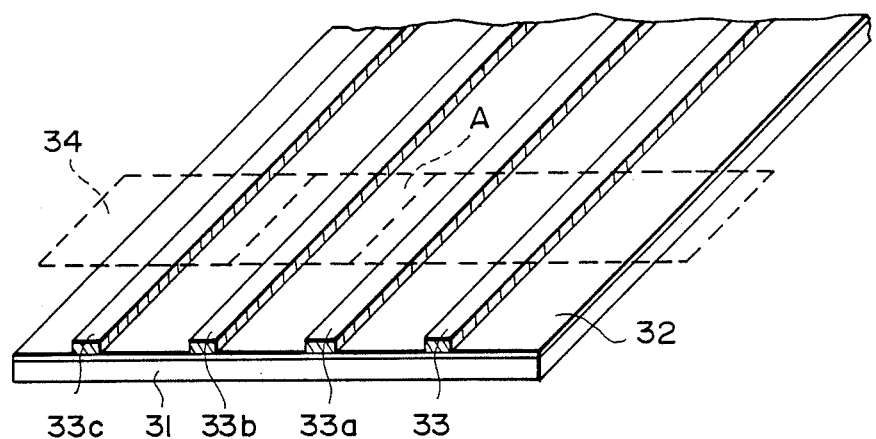
F I G. 3
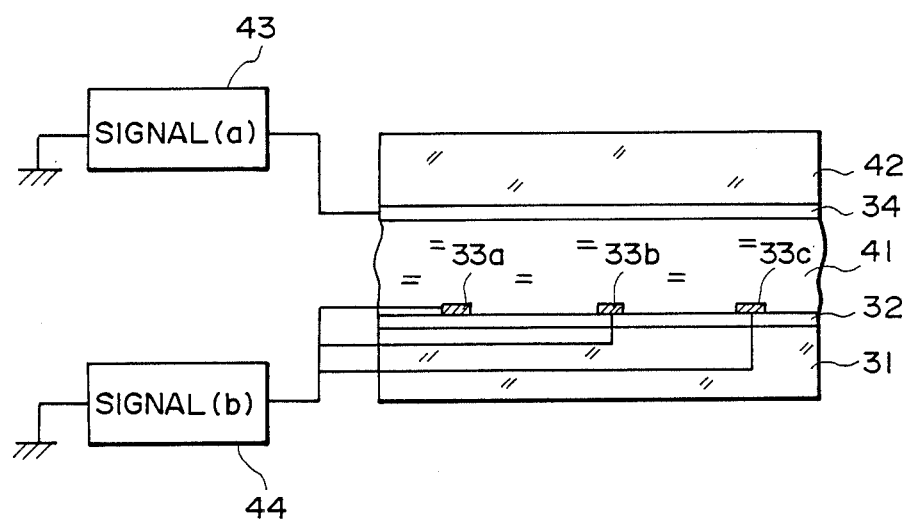
F I G. 5

FERROELECTRIC LIQUID CRYSTAL OPTICAL MODULATION DEVICE AND DRIVING METHOD THEREFOR FOR GRAY SCALE DISPLAY

FIELD OF THE INVENTION AND RELATED ART

The present invention relates to an optical modulation device for a display panel and a driving method therefor, more specifically a display panel using a liquid crystal material, especially a ferroelectric liquid crystal, showing at least two stable states, particularly a liquid crystal optical device adapted to gradational or tonal display, and a driving method therefor.

In the conventional liquid crystal television panel of the active matrix driving system, thin film transistors (TFTs) are arranged in matrix corresponding to respective pixels. When a gate-on pulse is applied to a TFT to turn on the source-drain channel, a picture image signal is applied to the source and stored in a capacitor. A liquid crystal (e.g., TN (twisted nematic) liquid crystal) is driven by the stored image signal and a gradational display is effected by voltage modulation of pixels.

However, such a television display panel of the active matrix driving system using a TN liquid crystal uses complicated structure of TFTs requiring a large number of production steps and is accompanied with high production costs. Moreover, there is a further problem that it is difficult to provide a large area of semiconductor film (e.g., of polysilicon, amorphous silicon) constituting TFTs.

On the other hand, a display panel of a passive matrix driving type using a TN liquid crystal has been known as having low production costs. However, in this type of liquid crystal display panel, when the number (N) of scanning lines is increased, a time period (duty factor) during which one selected point is subjected to an effective electric field during the time when one frame is scanned is decreased at a ratio of 1/N, whereby cross-talk occurs and a picture with a high contrast cannot be obtained. Furthermore, as the duty factor is decreased, it is difficult to control gradation of respective pixels by means of voltage modulation so that this type of display is not adapted for a display panel of a high pixel or wiring density, particularly one for a liquid crystal television panel.

SUMMARY OF THE INVENTION

A principal object of the present invention is to solve the above mentioned problems.

A more specific object of the present invention is to provide a driving method for an optical modulation device adapted for constituting a display panel of a high pixel density over a wide area and particularly suitable for a gradational display.

More specifically, the present invention provides a driving method for an optical modulation device, comprising:

providing an optical modulation device comprising a first substrate having a first conductor film thereon, a second substrate having thereon a second conductor film disposed opposite to the first conductor film, and an optical modulation material disposed between the first and second substrates; and forming a potential gradient along the extension of the first conductor film or both the first and second conductor films, and applying an information signal preferably based on gradation data to the first or second conductor film.

Thus, according to the present invention, there is provided a driving system for displaying a gradation by providing a potential gradient to at least one of two conductor films constituting a pixel along the extension thereof, applying a pulse signal with a height, pulse duration, or number of pulses corresponding to given gradation data so that there are formed a portion to which a voltage exceeding an inversion threshold voltage is applied and a portion at which a voltage applied does not exceed the inversion threshold, in the pixel.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 1 and 2 are schematic perspective views illustrating the operation principle of a ferroelectric liquid crystal device used in the present invention;

FIG. 3 is a partial perspective view of one side of a substrate used in the present invention;

FIG. 5 is a schematic sectional view of an optical modulation device according to the present invention;

DETAILED DESCRIPTION OF THE PREFERRED EMBODIMENTS

Figure 4A:
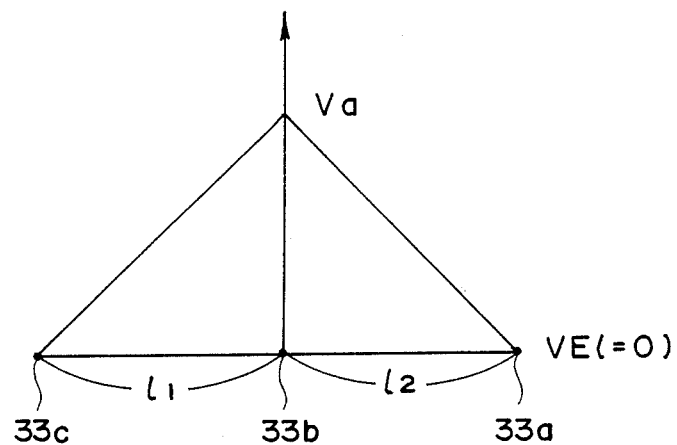
FIGS. 4A and 4B are explanatory views for schematically illustrating potential gradients used in the present invention.
Figure 4B:
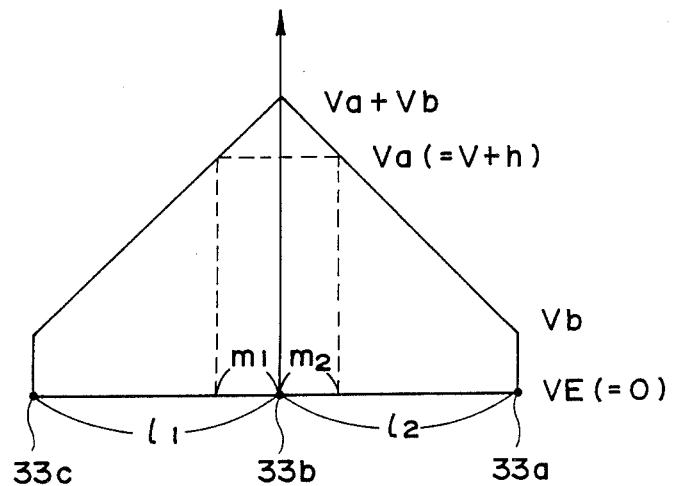

As an optical modulation material used in the driving method according to the present invention, a material which shows a first optically stable state (e.g., assumed to form a "bright" state) and a second optically stable state (e.g., assumed to form a "dark" state) depending on an electric field applied thereto, i.e., one showing at least two stable states in response to an electric field, particularly a liquid crystal showing such property, may be used.

Preferably ferroelectric liquid crystals showing at least two stable states, particularly bistability, which can be used in the driving method according to the present invention are chiral smectic liquid crystals having ferroelectricity, among which liquid crystals showing chiral smectic C phase (SmC*), H phase (SmH*), I phase (SmI*), F phase (SmF*) or G phase (SmG*) are suitable. These ferroelectric liquid crystals are described in, e.g., "LE JOURNAL DE PHYSIQUE LETTRE" 36 (L-69), 1975 "Ferroelectric Liquid Crystals"; "Applied Physics Letters" 36 (11) 1980, "Submicro Second Bistable Electrooptic Switching in Liquid Crystals", "Kotai Butsuri (Solid State Physics)" 16 (141), 1981 "Liquid Crystal", etc. Ferroelectric liquid crystals disclosed in these publications may be used in the present invention.

More particularly, examples of ferroelectric liquid crystal compounds usable in the method according to the present invention include decyloxybenzylidene-p'-amino-2-methylbutyl cinnamate (DOBAMBC), hexyloxybenzylidene-p'-amino-2-chloropropyl cinnamate (HOBACPC), 4-o-(2-methyl)-butylresorcylidene-4'-octylaniline (MBRA 8), etc.

When a device is constituted using these materials, the device may be supported with a block of copper, etc., in which a heater is embedded in order to realize a temperature condition where the liquid crystal compounds assume an SmC*, SmH*, SmI*, SmF* or SmG* phase.

Referring to FIG. 1, there is schematically shown an example of a ferroelectric liquid crystal cell for explanation of the operation thereof. Reference numerals 11a and 11b denote substrates (glass plates) on which a transparent electrode of, e.g., $In_2O_3$, $SnO_2$, ITO (Indium—Tin—Oxide), etc., is disposed, respectively. A liquid crystal of, e.g., an SmC*-phase in which liquid crystal molecular layers 12 are oriented perpendicular to surfaces of the glass plates is hermetically disposed therebetween. Full lines 13 show liquid crystal molecules. Each liquid crystal molecule 13 has a dipole moment (P⊥) 14 in a direction perpendicular to the axis thereof. When a voltage higher than a certain threshold level is applied between electrodes formed on the base plates 11a and 11b, a helical structure of the liquid crystal molecule 13 is unwound or released to change the alignment direction of respective liquid crystal molecules 13 so that the dipole moments (P⊥) 14 are all directed in the direction of the electric field. The liquid crystal molecules 13 have elongated shapes and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device, of which optical characteristics vary depending upon the polarity of an applied voltage. Further, when the thickness of the liquid crystal cell (the thickness of the ferroelectric liquid crystal layer) is sufficiently thin (e.g., $1\mu$), the helical structure of the liquid crystal molecules is unwound to provide a nonhelical structure even in the absence of an electric field whereby the dipole moment assumes either of the two states, i.e., Pa in an upper direction 23a or Pb in a lower direction 24a as shown in FIG. 2. When electric fields Ea or Eb higher than a certain threshold level and different from each other in polarity as shown in FIG. 2 and applied to a cell having the above-mentioned characteristics, the dipole moment is directed either in the upper direction 24a or in the lower direction 24b depending on the vector of the electric field Ea or Eb. In correspondence with this, the liquid crystal molecules are oriented in either of a first stable state 23a (bright state) and a second stable state 23b (dark state).

When the above-mentioned ferroelectric liquid crystal is used as an optical modulation element, it is possible to obtain two advantages. First is that the response speed is quite fast. Second is that the orientation of the liquid crystal shows bistability. The second advantage will be further explained with reference to FIG. 2. When the electric field Ea is applied to the liquid crystal molecules, they are oriented to the first stable state 23a. This state is stably retained even if the electric field is removed. On the other hand, when the electric field Eb of which direction is opposite to that of the electric field Ea is applied thereto, the liquid crystal molecules are oriented to the second stable state 23b, whereby the directions of molecules are changed. This state is also stably retained even if the electric field is removed. Further, as long as the magnitude of the electric field Ea or Eb being applied is not above a certain threshold value, the liquid crystal molecules are placed in the respective orientation states. In order to effectively realize high response speed and bistability, it is preferable that the thickness of the cell is as thin as possible and generally 0.5 to $20\mu$, particularly 1 to $5\mu$. A liquid crystal-electrooptical device having a matrix electrode structure in which the ferroelectric liquid crystal of this kind is used is proposed, e.g., in the specification of U.S. Pat. No. 4,367,924 by Clark and Lagerwall.

Hereinbelow, an embodiment of the display device used in the present invention will be explained with reference to FIG. 3.

Referring to FIG. 3, on one substrate 31 is disposed a display conductor film 32 and transmission electrodes 33 (33a, 33b, 33c, ...) of low resistive metal films which are laminated on the display conductor film 31 in parallel with each other and with equal spacings. Opposite the substrate 31, the other substrate (not shown) is disposed having a counter conductor film (counter electrode) 34 thereon so as to define pixels, e.g., one denoted by A. The above mentioned optical modulation material is sandwiched between the display conductor film 32 and the counter electrode 34.

In the liquid crystal optical device constructed in the manner described above, a potential gradient may be provided by applying a scanning voltage to a transmission electrode 33, thereby to cause a voltage gradient in the electric field between the display conductor film 32 and a counter electrode 34.

In this instance, when a transmission electrode 33b, for example, is supplied with a first reference potential Va and adjacent transmission electrodes 33a and 33c are supplied with a second reference potential (e.g., 0 volt), a potential gradient of Va is provided in a length $l_1$ between the transmission electrodes 33b and 33a and in a length $l_2$ between 33b and 33c along the extension of the conductor film 32.

At this time, when the inversion threshold voltage Vth is assumed to be Va, and an information signal of −Vb is applied to the counter electrode 34, a potential difference Va+Vb exceeding the inversion threshold voltage Vth is applied to the ferroelectric liquid crystal corresponding to lengths $m_1$ and $m_2$ along the extension of the conductor film 32, so that the region corresponding to the $m_1+m_2$ may be inverted, e.g., from the bright state to the dark state. Accordingly, a gradation may be displayed by applying a value Vb of signal selected corresponding to the gradation to individual pixels. In this instance, it is possible to modulate the magnitude of the voltage signal −Vb applied to the counter electrode 34 in the above described manner, alternatively to modulate the pulse duration thereof, or to modulate the number of pulses thereof, thereby to effect the control of the resultant gradation.

Next, a specific example of an optical modulation device which is preferred for providing the above mentioned gradational characteristic will be explained with reference to FIG. 3.

Referring to FIG. 3, a 3000 Å-thick transparent conductor film of SnO$_2$ (tin oxide) is formed by sputtering as a display conductor film 32 on a glass substrate 31. Then, a 1000 Å-thick Al film is formed by vacuum evaporation on the SnO$_2$ film and then patterned to form a plurality of transmission electrodes 33 in the form of stripes. For example, the transmission electrodes may be formed with a spacing of 230 μm and a width of 20 μm.

On the other hand, counter electrodes 34 of ITO (indium tin oxide) film are formed on a counter substrate.

On each of the thus prepared two substrates, about a 500 Å-thick polyvinyl alcohol film is formed as a liquid crystal orientation film and subjected to a rubbing treatment.

In a preferred embodiment according to the present invention, the sheet resistivity (according to ASTM D 257) of the display conductor film 32 may be preferably on the order of $10^4$ Ω/□ (ohm per square)–$10^7$ Ω/□ and may be on the order of $10^3$–$10^9$ Ω/□ as a tolerable range. An example of a film having such a resistivity may be an SnO$_2$ film as described above formed by sputtering in an argon stream. Such a method of sputtering in an argon stream is disclosed, for example, by D. B. Fraser and H. D. Cook, "Highly Conductive Transparent Films of Sputtered In$_2$–xSn$_x$O$_{3-y}$", Journal of the Electrochemical Society Solid-State Science and Technology, Vol. 119, No. 10 (published in 1972).

By adjusting the resistivity of the display conductor film 32 in the above described manner, the above described gradational display may be applicable to a wide variety of optical modulation materials, and moreover the power consumption can be minimized when a potential gradient is provided in the above mentioned manner.

The above condition is first of all effective to suppress the heat generation due to a current passing through the display electrode at the time of forming a potential gradient for gradational display.

More specifically, the temperature increase ΔT of the electrode may be calculated by the following equation as a simple theoretical calculation where a heat dissipation to the glass substrate, etc. is not considered:

$$T(°K.) = \frac{(V^2/R)(W) \times t(\text{sec})}{C(J/cm^3 \cdot °K.) \times v(cm^3)},$$

wherein the respective symbols denote the following:
V: $V_a - V_E$ (potential difference between transmission electrodes),
R: resistance between transmission electrodes,
t: application period for the above V,
C: heat capacity of a display electrode (between transmission electrodes), and
v: volume of the display electrodes between transmission electrodes.

Herein, when one pixel is noted, an if V is, e.g., 10 volts, t is 100 μsec., C is 2–3 J/cm$^3$·°K., and v is 230 μm×230 μm×3000 Å as exemplified above, then ΔT is calculated to be on the order of 250000/R (°K.). Even if the heat dissipation or conduction to the glass substrate, etc., is considered here, if the R (equal to the sheet resistivity as described above) is on the order of several Ω to several tens of Ω, the temperature increase amounts to a considerable value. It is possible that the temperature increase exerts an ill effect on the optical or physical properties of an optical modulation material disposed in the neighborhood. Especially, the effect is further pronounced when the voltage is increased, the writing period for a pixel is increased, or even if the writing period becomes shorter, the pixel area is decreased further. Moreover, in a case where the voltage V is 10 volts, if R is 100Ω for example, then the power consumption per pixel becomes 1 W, which amounts to a large value of 1 KW when a large number of such pixels are arranged in a matrix and, e.g., 1000 pixels are provided with a gradation at a time. Accordingly, as a result of consideration on the above matter, we have resolved the above problem by setting the sheet resistivity of the display electrode to above $10^3$ Ω/□. Further, in order to alleviate the above effect due to temperature increase, make possible the selection of an optical modulation material from a wide scope and smoothly reduce the writing period and pixel area, the sheet resistivity of $10^4$ Ω/□ or more may preferably be selected.

The upper limit of the sheet resistivity may preferably be on the order of $10^9$ Ω/□ or below, further preferably on the order of $10^7$ Ω/□ or below. The reason for this may be considered as follows. If the dielectric constant of an optical modulation material used is assumed to be about 5, a typical value for a ferroelectric liquid crystal, the layer thickness thereof be 1 μm, and the pixel area be 230 μm square, then the capacitance of the liquid crystal layer becomes about 2.5 pF ($2.5 \times 10^{-12}$ F) per pixel. Here, if it is required to drive the above liquid crystal for example in 100 μsec., it is preferred that the product CR of the resistance R of the display electrode and the capacitance C of the liquid crystal layer be sufficiently below the above mentioned 100 μsec. More specifically, when the above values are taken as typical, if $R = 10^7$ Ω/□, it becomes $2.5 \times 10^{-5}$ sec (25 μsec), so that optimization is possible if a lower R is used. However, if a slower driving is possible (e.g., 1 msec–10 msec) or a thicker liquid crystal layer providing a smaller capacitance is possible, then a resistivity on the order of $10^9$ Ω/□ may be acceptable.

By the above, optimum conditions for the display electrode for providing a gradation have been explained. On the other hand, the above mentioned transmission electrode may be sufficient if it can transmit a voltage signal to the display electrode from a terminal connected to a power supply. Thus, a transmission electrode of a sufficiently low sheet resistivity, e.g., around 1 Ω/□ or below, may be used. Further, as an example of the counter electrode, one of ITO of about 20 Ω/□ may suitably be used as described above.

As a specific example of practice, two substrates prepared in the above described manner were disposed oppositely to each other with a spacing of about 1 μm to form a cell, into which a ferroelectric liquid crystal (a composition consisting mainly of p-n-octyloxybenzoic acid-p'-(2-methylbutyloxy)phenylester and p-n-nonyloxybenzoic acid-p'-(2-methylbutyloxy)phenylester) was injected. The size of the pixel A constituted by a superposed portion of a display conductor film 32 and a counter electrode 34 was made 230 μm×230 μm, where the width of the pixel A was made $l_1/2 + l_2/2$.

On both sides of the liquid crystal cell thus prepared, a pair of polarizers were disposed in the form of cross nicols, and the optical characteristics were observed.

Figure 6:
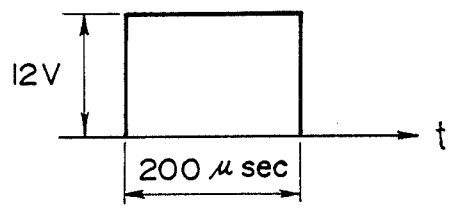
FIGS. 6 and FIGS. 7A-7E show examples of signals used in the present invention.

FIG. 5 schematically illustrates a method of applying electric signals to a liquid crystal cell which includes a substrate 31, a display electrode 32, transmission electrodes 33*a*, 33*b* and 33*c*, a counter electrode 34, a ferroelectric liquid crystal 41 which is preferably a chiral smectic liquid crystal under a bistability condition, and a counter substrate 42 by means of driver circuits 43 and 44 for supplying signals. FIGS. 6 and 7 show electric signals applied to the liquid crystal cell. More specifically, FIG. 6 shows a waveform of SIGNAL (b) generated by the driver circuit 44 shown in FIG. 5, and FIGS. 7A–7E show waveforms of SIGNAL (a) generated by the driver circuit 43 shown in FIG. 5.

Now, a 200 μsec-pulse of −12 V is applied as a signal (b) to all the transmission electrodes 33a, 33b, 33c, . . . , and a 200 μsec-pulse (called "erasure pulse") is preliminarily applied in phase with a counter electrode 34 in an erasure step. Then, the liquid crystal 41 is switched to the first stable state to provide a bright state (as a pair of polarizers are arranged in cross nicols in such a manner). Incidentally, for convenience of explanation, the liquid crystal used herein is assumed to have a switching or inversion threshold of ±15 V–±16 V.

From this state, in phase with the pulse shown in FIG. 6 applied to the transmission electrode 33b as a signal (b) while the transmission electrodes 33a and 33c are placed at a reference potential (0 in this example), various pulses as shown in FIGS. 7A–7E are respectively applied to the pixel A. The resultant optical states of the pixel A are shown in FIGS. 8A–8D.

Figure 7A:
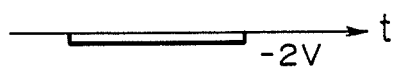
Figure 7B:
Figure 7C:
Figure 7D:
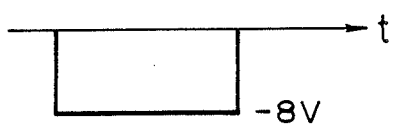
Figure 7E:
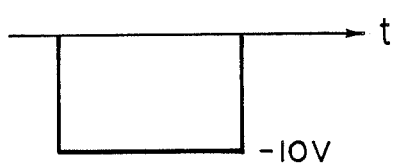
Figure 8A:
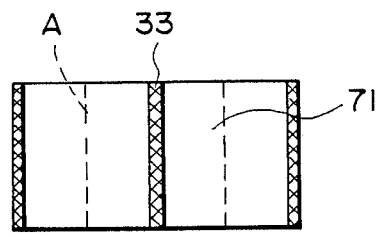
FIGS. 8A-8D show schematic sketches showing bright-to-dark gradational states of a pixel obtained correspondingly.
Figure 8B:
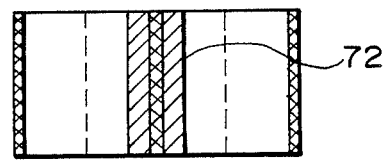
Figure 8C:
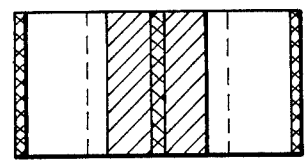
Figure 8D:
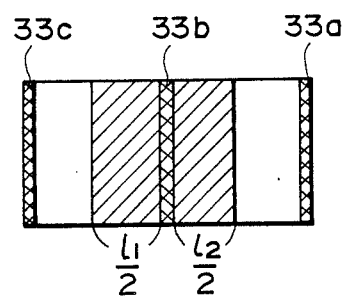

More specifically, when the pulse voltage applied to the counter electrode is −2 V as shown in FIG. 7A, no change at all occurs from the bright state 71 as shown in FIG. 8A. When a pulse voltage of −4 V as shown in FIG. 7B is applied, a portion of the liquid crystal in a close proximity of the transmission electrode 33b is switched to a dark state 72 as shown in FIG. 8B because of an electric field exceeding the threshold of the liquid crystal. When the applied voltage is further increased to −6 V (FIG. 7C) or −8 V (FIG. 7D), the dark state area 72 is enlarged as representatively shown in FIG. 8C because the area of exceeding the switching threshold is enlarged. When the applied voltage is −10 V (FIG. 7E), the pixel A is wholly changed to the dark state as shown in FIG. 8D. In this way, a gradational image may be formed.

Figure 9:
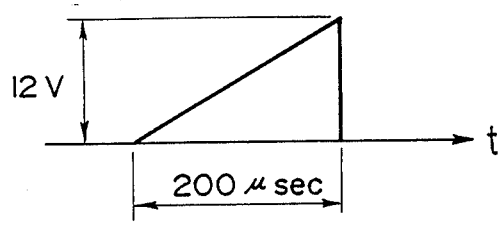
FIG. 9, FIGS. 10AA-10AE and FIGS. 10BA-10BE show other examples of pulse signal waveforms used in the present invention.
Figure 10A:
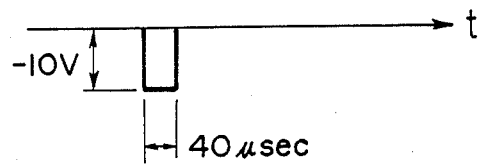
Figure 10A:
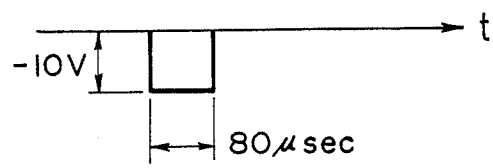
Figure 10A:
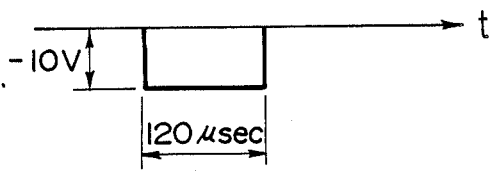
Figure 10A:
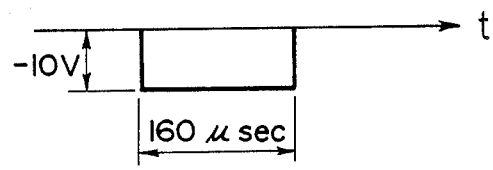
Figure 10A:
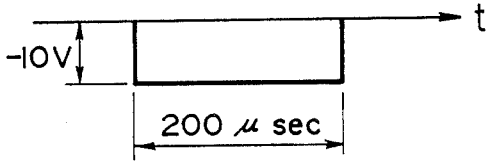

The optical state changes as shown in FIGS. 8A–8D may also be obtained when various pulses (a) with different pulse durations as shown in FIGS. 10AA–10AE are applied in phase with a triangular wave signal (b) as shown in FIG. 9. More specifically, in this instance, a gradational display may be effected by applying the signal shown in FIG. 9B to the transmission electrode 33b while applying the pulses shown in FIGS. 10AA–10AE to the counter electrode 34 corresponding to given gradation data in phase with the signal applied to the transmission electrode 33b.

Figure 10B:
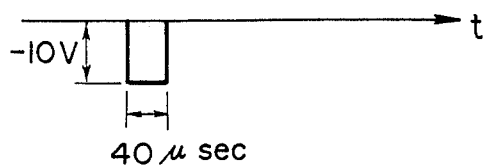
Figure 10B:
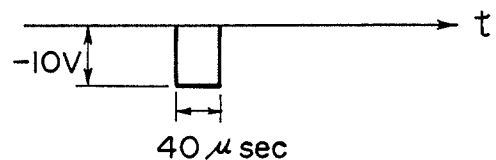
Figure 10B:
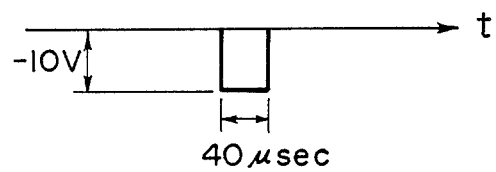
Figure 10B:
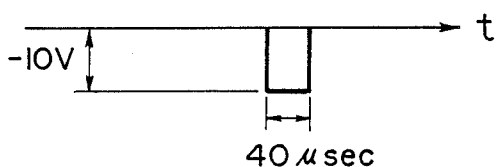
Figure 10B:
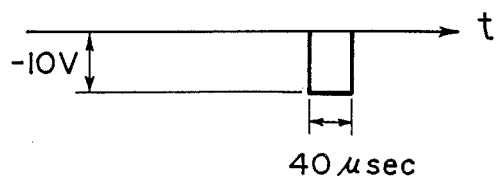

Further, it would be readily understood that a similar effect is obtained by applying various pulses (a) of different phases as shown in FIGS. 10BA–10BE in synchronism with the triangular wave signal (b).

In this invention, the transmission electrodes 33a, 33b, . . . may be composed of a metal such as silver, copper, gold or chromium, or a transparent electrode such as low-resistivity ITO instead of aluminum (Al) used in the above example. The sheet resistivity may preferably be $10^2$ Ω/□ or below.

The sheet resistivity of the electrodes may be adjusted to an appropriate value, for example, by controlling the film thickness.

In the above, a method of providing a gradation has been explained. However, it is of course possible to provide a two-value display without expressing a gradation by particularly selecting two signal levels. In this case, the signal shown in FIG. 7E, or FIG. 10AE or 10BE may be used as an inversion signal.

Figure 11:
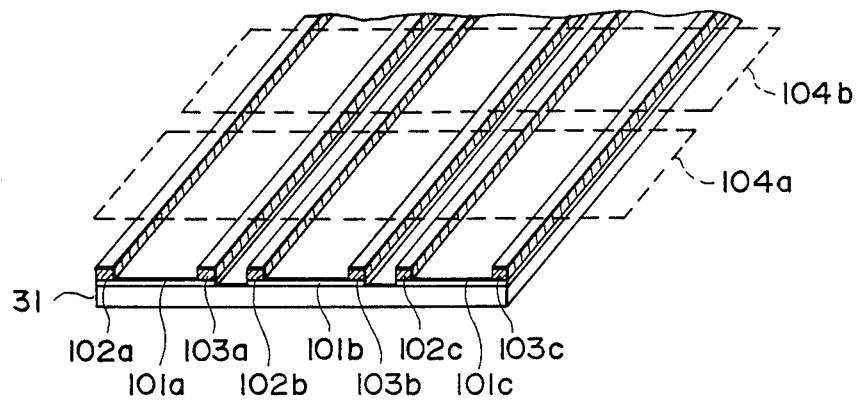
FIG. 11 is a schematic perspective view of another liquid crystal otpical device used in the present invention.

FIG. 11 is a partial schematic view of a specific embodiment of a liquid crystal panel adapted to application of the gradational display system to matrix driving.

The display panel shown in FIG. 11 comprises a plurality of stripe conductor films 101 (101a, 101b, 101c, . . . ) disposed on a glass substrate 31, and transmission electrodes 102 (102a, 102b, 102c, . . . ) and 103 disposed on both lateral sides along the longitudinal direction of each stripe conductor film 101. Opposite to the substrate 31, there is disposed a counter substrate (not shown) on which counter electrodes 104 (104a, 104b, . . . ) are disposed. Further, a ferroelectric liquid crystal is disposed between the stripe electrode films 101 and the counter electrodes 104.

In this embodiment, prior to writing, the transmission electrodes 102 and 103 are placed at the same potential level so as to apply a uniform electric field across the whole or a part of the pixels formed at the intersections of the stripe conductor films 101 and the stripe counter electrodes 104, thereby to bring the whole or the part of the pixels to either one of the bright and dark states at a time; or prior to writing for each writing line, the whole or a part of the pixels on the writing line are brought to either one of the bright and dark states. Then, a pulse as shown in FIG. 6 or 9 is sequentially applied as a scanning signal to individual transmission electrodes on one side while transmission electrodes on the other side are placed at a reference potential level (e.g., 0 volt), whereby a potential gradient is sequentially provided to the stripe conductor films 101 between the transmission electrodes 102 and 103. In this instance, the scanning selection signal is preferably made a voltage pulse equal to or somewhat lower than the inversion threshold voltage of the ferroelectric liquid crystal.

On the other hand, voltage signals as shown in FIGS. 7A–7E or FIGS. 10AA–10AE (or 10BA–10BE) corresponding to give gradation data are applied to respective stripe counter electrodes 104 in phase with the scanning selection signal applied to the transmission electrodes 102, whereby the pixels on a scanned line are written into a gradational state. By conducting the above writing operation line-sequentially, one picture frame with gradation can be formed.

In this case, a pixel corresponding to the above mentioned pixel A is formed at an intersection of stripe electrodes 101 and 104, and the inverted region of the liquid crystal is caused to spread from either one prescribed of the transmission electrodes 102 and 103.

Further, in the present invention, it is also possible to provide a picture frame with gradations by applying a scanning pulse signal as shown in FIG. 6 or FIG. 9 sequentially to the stripe electrodes 104, and in phase with the scanning signal, applying voltage signals as shown in FIG. 7 or FIG. 10 corresponding to given gradation data to transmission electrodes on one side, e.g., 102, while the other transmission electrodes are connected to a reference potential level.

Figure 12:
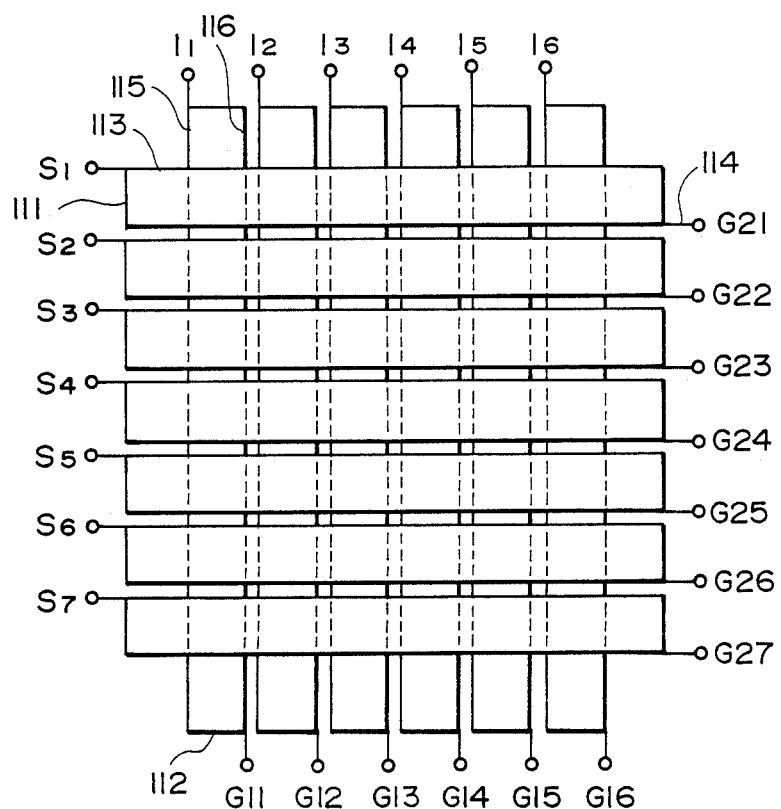
FIGS. 12, 13 and 14 are schematic plan views showing other examples of matrix electrode arrangement used in the present invention.

FIG. 12 shows a matrix electrode arrangement according to another embodiment of the present invention. A liquid crystal optical device represented by the electrode arrangement shown in FIG. 12 comprises a plurality of stripe conductor films 111 disposed on one substrate, and a plurality of stripe conductor films 112 disposed opposite to and intersecting with the stripe conductor films 111 on the other substrate by the medium of a ferroelectric liquid crystal. Further, to both lateral sides of the stripe conductor films 111 and 112, transmission electrodes 113 and 114, and 115 and 116, of low resistivity, are respectively connected.

Individual terminals $S_1, S_2, \ldots S_7, \ldots$ of the transmission electrodes 113 are connected to a scanning signal generator circuit (not shown), and individual terminals $I_1, I_2, \ldots I_6, \ldots$ of the transmission electrodes 115 on the other side are connected to an information signal generator circuit (not shown) and terminals $G_{11}, G_{12}, \ldots G_{16} \ldots$, and $G_{22}, \ldots G_{27}, \ldots$ are connected to a reference potential supply (e.g., at 0 volt).

As a result, according to this embodiment, at respective pixels after an erasure step, a potential gradient is developed along the extension of a scanning signal side conductor film and also a potential gradient is developed along the extension of an information signal side conductor film, so that a potential difference with a gradient generated by the combination of the potential gradients on both sides is applied to the ferroelectric liquid crystal at a pixel, whereby display of a picture with multi-level gradation becomes possible.

In this instance, when a potential gradient is provided between transmission electrodes for supplying information signals and a case of driving a picture frame with, e.g., 1000×1000 pixels is considered, a power consumed in display electrodes between transmission electrodes for supplying information signals amounts to those required at pixels in a number of 1000×(the number of selected pixels). As a result, the power consumed becomes considerable unless the display electrodes have an appropriately low resistivity. Accordingly, it is most preferable to provide a potential gradient between transmission electrodes for supplying a scanning signal as is in the embodiment shown in FIG. 11 or one shown in FIG. 13 explained hereinafter.

In the structures shown in FIGS. 11 and 12, the stripe conductor films 101 are provided separately for respective lines. According to the present invention, the stripe conductor film may preferably be composed of $SnO_2$, etc., providing a high resistivity of $10^3$ Ω/□ than ITO of a low resistivity. Now, a process for effectively and finely etching an $SnO_2$ film is briefly described.

More specifically as an etching process for an $SnO_2$ film, it has been known to etch the $SnO_2$ film with a paste of zinc powder mixed with water or with a dilute hydrochloric acid in some cases, a preferred fine etching process is one wherein an $SnO_2$ film is etched by reacting the $SnO_2$ with $BF_3$ (boron trifluoride) plasma to separate the $SnO_2$.

Figure 13:
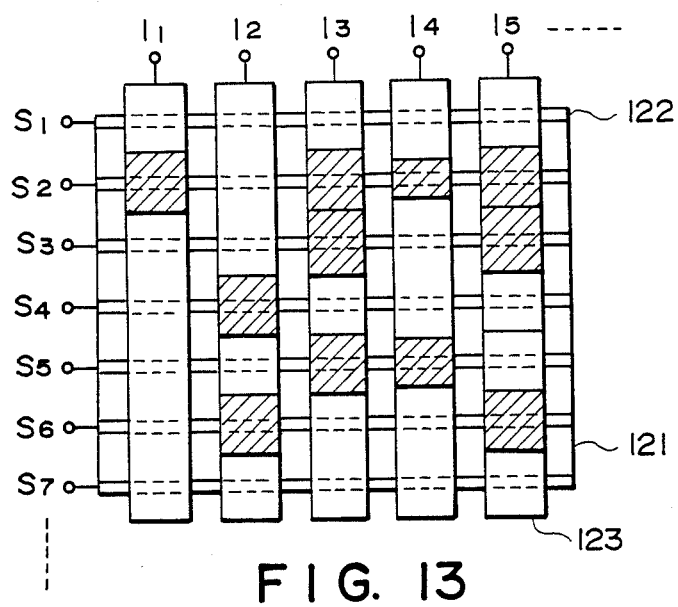

FIG. 13 shows an electrode arrangement according to another embodiment. A liquid crystal optical device represented by FIG. 13 comprises a plurality of transmission electrodes 122 disposed in parallel with each other on one conductor film 121 respectively connected to terminals $S_1, S_2, \ldots S_7, \ldots$ which in turn are connected to a scanning signal generator circuit (not shown). Intersecting with these transmission electrodes 122, electrodes 123 of plural stripe conductor films 123 are oppositely disposed, and a ferroelectric liquid crystal is disposed between the conductor film 121 and the stripe electrodes 123. The terminals $I_1, I_2, \ldots I_5, \ldots$ are respectively connected to an information signal generator circuit (not shown).

As a result, after an erasure step in this embodiment, a scanning signal is sequentially applied to terminals $S_1, S_2, \ldots S_7, \ldots$ of the liquid crystal optical device while connecting the remaining terminals not supplied with the scanning signal to a reference potential supply, thereby to provide a potential gradient. On the other hand, gradation signals are supplied to the stripe electrodes 123 in phase with the scanning signal, whereby a gradational picture may be formed.

Herein, it is possible to apply the scanning signal first to, e.g., the odd-numbered terminals $S_1, S_3, S_5 \ldots S_{2n-1}$ sequentially, and then to the even-numbered terminals $S_2, S_4, S_6, \ldots S_{2n}$ sequentially.

In the foregoing explanation, the reference potential level has been mainly referred to as 0 volt, whereas the reference potential level may be raised to some extent. In this case, the resultant potential gradient for providing a gradation becomes moderate as the potential difference $V_a - V_E$ becomes smaller, but the absolute value of the potential level provided to the information signal can be decreased.

On the contrary, it is also possible to enlarge the gradation range by lowering the reference potential level to increase $V_a - V_E$.

Further, in the present invention, it is also possible to effect gradational driving by sequentially applying a scanning signal to the stripe electrodes, and in phase with the scanning signal, applying gradation signals to the odd-numbered (or even-numbered) transmission electrodes while connecting the even-numbered (or odd-numbered) transmission electrodes to a reference potential supply.

Figure 14:
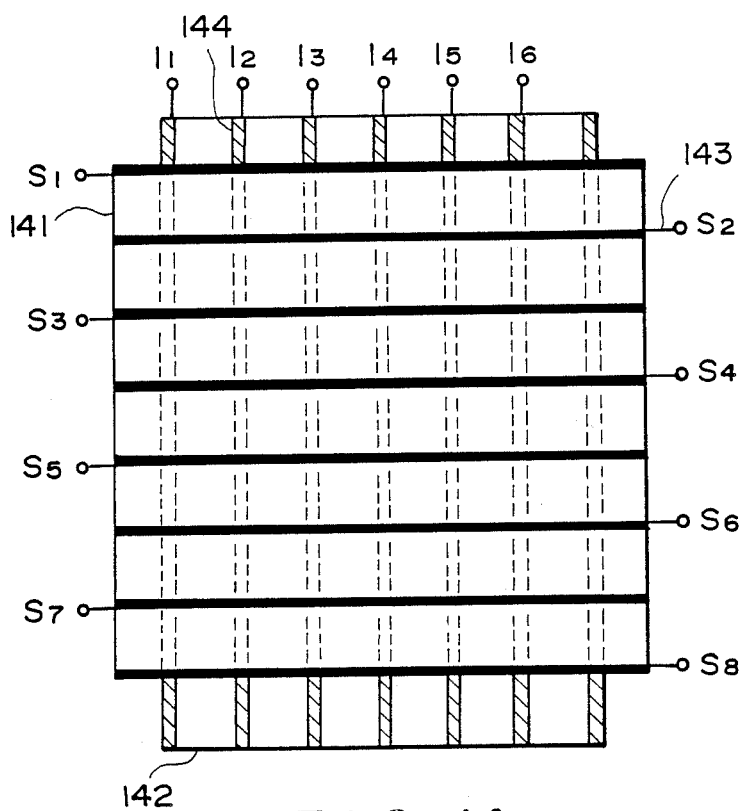

FIG. 14 shows a matrix electrode arrangement according to still another embodiment of the present invention. A liquid crystal optical device represented by FIG. 13 comprises conductor films 141 on one substrate, a plurality of conductor films 142 disposed on the other substrate disposed opposite to and intersecting with the conductor films 141, and a ferroelectric liquid crystal disposed between the conductor films 141 and 142. Further, low-resistivity transmission electrodes 143 and 144 are disposed on the conductor films 141 and 142.

In this embodiment, terminals $S_1, S_2, \ldots S_7 \ldots$ of the transmission electrodes are respectively connected to a scanning signal generator circuit (not shown), and terminals $I_1, I_2, \ldots I_6, \ldots$ of the transmission electrodes on the other side are respectively connected to an information signal generator circuit (not shown).

As a result, according to this embodiment, at respective pixels after an erasure step, a potential gradient is developed along the extension of a scanning signal side conductor film and also a potential gradient is developed along the extension of an information signal side conductor film, so that a potential difference with a gradient generated by the combination of the potential gradients on both sides is applied to the ferroelectric liquid crystal at a pixel, whereby display of a picture with multilevel gradation becomes possible.

In the above, the present invention has been explained with reference to a device using a ferroelectric liquid crystal, particularly a ferroelectric liquid crystal having at least two stable states, as a most preferable example, whereas the present invention may also be applied to another liquid crystal such as a twisted-nematic liquid crystal or a guest-host liquid crystal or further to an optical modulation material other than a liquid crystal.

Thus, according to the present invention, a gradational display may be effected by forming in the extension of at least one of a pair of electrodes constituting a pixel, and applying a gradation signal modulated with respect to voltage, pulse duration or number of pulses as an input signal.

What is claimed is:

1. A method for driving an optical modulation device, comprising:
   providing an optical modulation device comprising a first substrate having a first conductor film thereon, a second substrate having thereon a second conductor film disposed opposite to said first conductor film, and an optical modulation material disposed between said first and second substrates; and
   forming a potential gradient along an extension of said first conductor film or both said first and second conductor films, and applying an information signal to said first or second conductor film.

2. A method according to claim 1, wherein said optical modulation device comprises said first substrate having thereon said first conductor film and at least two transmission electrodes connected to said first conductor film, said second substrate having thereon said second conductor film disposed opposite to said first conductor film, and said optical modulation material disposed between said first and said second substrates; a voltage signal providing a potential gradient along said first conductor film between said transmission electrodes is applied to said transmission electrodes; and an information signal is applied to said second conductor film.

3. A method according to claim 1, wherein said first and second conductor films are respectively provided in a plurality so as to form a matrix electrode structure, each first conductor film being connected to a transmission electrode; a scanning signal is sequentially applied to a resultant plurality of transmission electrodes; and an information signal is applied to said second conductor film.

4. A method according to claim 3, wherein said first conductor films are disposed in the form of stripes, transmission electrodes are connected to both lateral sides of each stripe conductor film, one transmission electrode is supplied with said scanning signal, and the other transmission electrode is connected to a reference potential supply.

5. A method according to claim 3, which further comprises a step of applying a scanning signal to an odd-numbered or, an even-numbered transmission electrode among said plurality of transmission electrodes connected to said first conductor films, and a step of applying a scanning signal to an even-numbered or an odd-numbered transmission electrode, respectively, among said plurality of transmission electrodes.

6. A method according to claim 1, wherein said optical modulation device comprises said first substrate having thereon a plurality of stripe conductor films, and a first and a second transmission electrode connected to respective lateral sides of each stripe conductor film, said second substrate having thereon a plurality of stripe electrodes disposed opposite to said stripe conductor films, and said optical modulation material disposed between said first and second substrates; a scanning signal is sequentially applied to said first transmission electrodes while said second transmission electrodes are connected to a reference potential supply, and an information signal is applied to said stripe electrodes in phase with said scanning signal.

7. A method according to claim 1, wherein said optical modulation device comprises said first substrate having thereon said first conductor film and at least two transmission electrodes connected to said first conductor film, said second substrate having thereon a plurality of stripe electrodes disposed opposite to and intersecting with said transmission electrodes, and said optical modulation material disposed between said first and second substrates; a scanning signal is sequentially applied to said transmission electrodes while connecting the remaining transmission electrodes not supplied with said scanning signal to a reference potential supply, and an information signal is applied to said stripe electrodes in phase with said scanning signal.

8. A method according to claim 1, wherein said optical modulation device comprises said first substrate having thereon a plurality of stripe conductor films, and a first and a second transmission electrode connected to respective lateral sides of each stripe conductor film, said second substrate having thereon a plurality of stripe electrodes disposed opposite to said stripe conductor films, and said optical modulation material disposed between said first and second substrates; a scanning signal is sequentially applied to said stripe electrodes, an an information signal is applied to said first transmission electrodes while said second transmission electrodes are connected to a reference potential supply.

9. A method according to claim 1, wherein said optical modulation device comprises said first substrate having thereon said first conductor film and at least two transmission electrodes connected to said first conductor film, said second substrate having thereon a plurality of stripe electrodes disposed opposite to and intersecting with said transmission electrodes, and said optical modulation material disposed between said first and second substrates; a scanning signal is sequentially applied to said transmission electrodes while the remaining transmission electrodes not supplied with said information signal are connected to a reference potential supply.

10. A method according to claim 1, wherein said optical modulation device comprises said first substrate having thereon a plurality of stripe conductor films, and a first and a second transmission electrode connected to respective lateral sides of each stripe conductor film, said second substrate having thereon a plurality of second stripe conductor films, and a third and a fourth transmission electrode connected to respective lateral sides of each second stripe conductor film, and said optical modulation material disposed between said first and second substrates; a scanning signal is sequentially applied to said first transmission electrodes while said second transmission electrodes are connected to a reference potential supply, and an information signal is applied to said third transmission electrodes in phase with said scanning signal while said fourth transmission electrodes are connected to a reference potential supply.

11. A method according to claim 1, wherein said information signal is one corresponding to given gradation data.

12. A method according to claim 11, wherein said information signal corresponding to given gradation data is a voltage-modulated pulse signal.

13. A method according to claim 11, wherein said information signal corresponding to given gradation data is a pulse duration-modulated pulse signal.

14. A method according to claim 11, wherein said information signal corresponding to given gradation data is a pulse number-modulated pulse signal.

15. A method according to claim 1, wherein said optical modulation material is a liquid crystal.

16. A method according to claim 15, wherein said liquid crystal is a ferroelectric liquid crystal.

17. A method according to claim 16, wherein said ferroelectric liquid crystal is a chiral smectic liquid crystal.

18. A method according to claim 16, wherein said ferroelectric liquid crystal is a chiral smectic liquid crystal having a non-helical structure.

19. A method according to claim 1, wherein a pixel is formed at an intersection of said first and second conductor films, and further comprising a step of erasing a previous state of said pixel is provided before said information signal is applied to said pixel.

20. A method according to claim 1, wherein said first and second conductor films are respectively provided in a plurality so as to form a matrix electrode structure, and second conductor films being in the form of stripes; a transmission electrode being connected to each first conductor film; a scanning signal is sequentially applied to said stripe second conductor films; and an information signal is applied to said transmission electrodes.

21. A method according to claim 20, which further comprises a step of applying an information signal to an odd-numbered or an even-numbered transmission electrode, and a step of applying an information signal to an even-numbered or an odd-numbered transmission electrode, respectively, among the plurality of transmission electrodes.

22. A method according to claim 1, wherein said first and second conductor films are respectively connected to at least two transmission electrodes, a scanning signal is sequentially applied to said transmission electrodes connected to said first conductor film, and an information signal is applied to said transmission electrodes connected to said second conductor film.

23. A liquid crystal apparatus, comprising:
a liquid crystal device comprising a first substrate having thereon a first conductor film, a second substrate having thereon a second conductor film opposite to said first conductor film, and a ferroelectric liquid crystal disposed between said first and second substrates;
means for forming a potential gradient along an extension of said first conductor film or both said first and second conductor films; and
means for applying an information signal to said first or second conductor film.

24. An apparatus according to claim 23, which comprises:
said liquid crystal device comprising said first substrate having thereon said first conductor film and at least two transmission electrodes connected to said first conductor film, said second substrate having thereon said second conductor film disposed opposite to said first conductor film, and said ferroelectric liquid crystal disposed between said first and second substrates;
means for applying a voltage signal providing a potential gradient along said first conductor film between said transmission electrodes to said transmission electrodes; and
means for applying an information signal to said second conductor film.

25. An apparatus according to claim 23, wherein said first and second conductor films are respectively provided in a plurality so as to form a matrix electrode structure, each first conductor film being connected to a transmission electrode; and said apparatus comprises means for sequentially applying a scanning signal to said transmission electrodes, and means for applying an information signal to said second conductor film.

26. An apparatus according to claim 25, wherein said first conductor films are disposed in the form of stripes, transmission electrodes are connected to both lateral sides of each stripe conductor film, one transmission electrode is supplied with said scanning signal, and said other transmission electrode is connected to a reference potential supply.

27. An apparatus according to claim 23, which comprises:
said liquid crystal device comprising said first substrate having thereon a plurality of stripe conductor films, and a first and a second transmission electrode connected to respective lateral sides of each stripe conductor film, said second substrate having thereon a plurality of stripe electrodes disposed opposite to said stripe conductor films, and said ferroelectric liquid crystal disposed between said first and second substrates; and
means for sequentially applying a scanning signal to said first transmission electrodes while connecting said second transmission electrodes to a reference potential supply, and applying an information signal to said stripe electrodes in phase with said scanning signal.

28. An apparatus according to claim 23, which comprises:
said liquid crystal device comprising said first substrate having thereon said first conductor film and at least two transmission electrodes connected to said first conductor film, said second substrate having thereon a plurality of stripe electrodes disposed opposite to and intersecting with said transmission electrode, and said ferroelectric liquid crystal disposed between said first and second substrates; and
means for sequentially applying a scanning signal to said transmission electrodes while connecting the remaining transmission electrodes not supplied with said scanning signal to a reference potential supply, and applying an information signal in phase with said scanning signal.

29. An apparatus according to claim 23, which comprises:
said liquid crystal device comprising said first substrate having thereon a plurality of stripe conductor films, and a first and a second transmission electrode connected to respective lateral sides of each stripe conductor film, said second substrate having thereon a plurality of stripe electrodes disposed opposite to said stripe conductor films, and said ferroelectric liquid crystal disposed between said first and second substrates; and
means for sequentially applying a scanning signal to said stripe electrodes, and applying an information signal to said first transmission electrodes while connecting said second transmission electrodes, to a reference potential supply.

30. An apparatus according to claim 23, which comprises:
said liquid crystal device comprising said first substrate having thereon said first conductor film and at least two transmission electrodes connected to said first conductor film, said second substrate having thereon a plurality of stripe electrodes disposed opposite to an intersecting with said transmission electrode, and said optical modulation material disposed between said first and second substrates; and means for sequentially applying a scanning signal to said stripe electrodes, and applying an information signal selectively to said transmission electrodes while connecting said remaining transmission electrodes not supplied with said information signal to a reference potential supply.

31. An apparatus according to claim 23, which comprises:

said liquid crystal device comprising said first substrate having thereon a plurality of first stripe conductor films, and a first and a second transmission electrode connected to respective lateral sides of each first stripe conductor film, said second substrate having thereon a plurality of second stripe conductor films, and third and a fourth transmission electrode connected to respective lateral sides of each second stripe conductor film, and said ferroelectric liquid crystal disposed between said first and second substrates; and means for sequentially applying a scanning signal to said first transmission electrodes while connecting said second transmission electrodes, to a reference potential supply, and applying an information signal to said third transmission electrode in phase with said scanning signal while connecting said fourth transmission electrodes to a reference potential supply.

32. An apparatus according to claim 23, wherein said information signal is one corresponding to given gradation data.

33. An apparatus according to claim 32, wherein said information signal corresponding to given gradation data is a voltage-modulated pulse signal.

34. An apparatus according to claim 32, wherein said information signal corresponding to given gradation data is a pulse duration-modulated pulse signal.

35. An apparatus according to claim 32, wherein said information signal corresponding to given gradation data is a pulse number-modulated pulse signal.

36. An apparatus according to claim 23, wherein said ferroelectric liquid crystal is a chiral smectic liquid crystal.

37. An apparatus according to claim 23, wherein said ferroelectric liquid crystal is a chiral smectic liquid crystal having a non-helical structure.

38. An apparatus according to claim 23, wherein said first conductor film or both said first and second conductor films have a sheet resistivity of $10^3$ $\Omega/\square$ or above.

39. An apparatus according to claim 38, wherein the sheet resistivity is in said range of $10^3$ to $10^{19}$ $\Omega/\square$.

40. An apparatus according to claim 38, wherein the sheet resistivity is in said range of $10^3$ to $10^9$ $\Omega/\square$.

41. A device according to claim 23, wherein said first and second conductor films are respectively provided in a plurality so as to form a matrix electrode structure, said second conductor films being in the form of stripes, a transmission electrode being connected to each first conductor film, said stripe second conductor films being adapted for sequentially receiving a scanning signal, said transmission electrodes being adapted for receiving an information signal.

42. An optical modulation device comprising: a first conductor film, a second conductor film disposed opposite to said first conductor film, and an optical modulation material disposed between said first and second conductor films; at least one of said first and second conductor films having a sheet resistivity of $10^3$ $\Omega/\square$ or above, a plurality of pixels being defined two-dimensionally along an extension of said conductor films so that a potential gradient may be developed at respective pixels along at least one of said first and second conductor films.

43. A device according to claim 42, wherein at least two transmission electrodes are connected to at least one of said first and second conductor films, said transmission electrodes having a sheet resistivity of below $10^3$ $\Omega/\square$.

44. A device according to claim 42, wherein said plurality of pixels are arranged in a plurality of rows and columns, said pixels in each row are commonly connected to said first conductor film, said pixels in each column are commonly connected to said second conductor film, at least two transmission electrodes are connected to said first conductor film, and a portion of said conductor film between said transmission electrodes has a sheet resistivity of $10^3$ $\Omega/\square$ or above; said first conductor film being adapted for sequentially receiving a scanning signal, and said second conductor film being adapted for receiving an information signal.

45. A device according to claim 44, wherein said first and second conductor films are respectively disposed in the form of stripes.

46. A device according to claim 42, wherein said first conductor film is disposed to extend two-dimensionally, at least two transmission electrodes are connected to said two-dimensionally extended first conductor film so as to provide a sheet resistivity of at least $10^3$ $\Omega/\square$ to said first conductor film between said transmission electrodes, said second conductor film is provided in a plurality in the form of stripes, and said stripe conductor films are disposed to intersect with said transmission electrodes; said first conductor film being adapted for receiving a scanning signal, and said second conductor film being adapted for receiving an information signal.

47. A device according to claim 42, wherein said optical modulation material is one showing at least two stable states in response to an electric field.

48. A device according to claim 42, wherein said optical modulation material is a ferroelectric liquid crystal.

49. A device according to claim 48, wherein said ferroelectric liquid crystal is a chiral smectic liquid crystal.

50. A device according to claim 49, wherein said chiral smectic liquid crystal is disposed in a layer thin enough to release a helical structure thereof in the absence of an electric field.

51. A device according to claim 42, wherein the sheet resistivity is in the range of $10^3$ to $10^9$ $\Omega/\square$.

52. A device according to claim 42, wherein the sheet resistivity is in the range of $10^3$ to $10^9$ $\Omega/\square$.

53. An optical modulation device, comprising:
a first substrate having thereon a first conductive layer;
a second substrate having a second conductive layer disposed opposite to said first conductive layer; and
an optical modulation material disposed between said first and second substrates, wherein both said first and second conductive layers having an alternate high-resistivity portion and a low-resistivity portion.

54. A device according to claim 53, wherein said high resistivity portion has a sheet resistivity of $10^3$ $\Omega/\square$ or above.

55. A device according to claim 53, wherein said optical modulation material is one showing at least two stable states in response to an electric field.

56. A device according to claim 53, wherein said optical modulation material is a ferroelectric liquid crystal.

57. A device according to claim 56, wherein said ferroelectric liquid crystal is a chiral smectic liquid crystal.

58. A device according to claim 57, wherein said chiral smectic liquid crystal is disposed in a layer thin enough to release a helical structure thereof in the absence of an electric field.

* * * * *